United States Patent Office 3,207,687
Patented Sept. 21, 1965

3,207,687
PREPARATION OF THERMOSETTING
RESINOUS MATERIAL
John E. Maier, St. Paul, Minn., assignor to Minnesota
Mining and Manufacturing Company, St. Paul, Minn.,
a corporation of Delaware
No Drawing. Filed Sept. 25, 1963, Ser. No. 311,591
3 Claims. (Cl. 208—44)

This application is a continuation-in-part of my copending application Serial No. 860,668, filed December 21, 1959, now abandoned.

This invention relates to the preparation of normally solid, phosphorus-containing, partially-cured, thermosetting, hydrocarbonaceous resinous materials.

It is an object of this invention to teach a new method for preparing thermosetting hydrocarbonaceous resinous materials which have excellent thermal and chemical stability as thermoset compositions. These materials may be employed by themselves or in admixture with other materials, such as fillers and the like. Especially useful compositions are admixtures of these materials with other thermosetting, heat-curable resins. These compositions may be utilized in the manufacture of reinforced plastic laminates, ablation applications such as in the manufacture of nose cones and rocket nozzles and as friction particles or binders such as in the manufacture of brake linings and transmission or clutch surfaces. Heretofore normally solid, partially-cured, thermosetting hydrocarbonaceous resinous materials have been prepared by treating hydrocarbon pitches with oxidizing agents.

It has now been discovered that a similar class or resins, i.e., phosphorus-containing, may be prepared by heating certain hydrocarbon pitches in the presence of phosphorus pentoxide. Obviously the reaction mechanism is not the same as that obtained in the utilization of oxidizing agents since phosphorus pentoxide is not an oxidizing agent.

The normally solid, phosphorus-containing, partially-cured, thermosetting hydrocarbonaceous resinous material prepared by the process of this invention has a softening point of 140 to 250° C., preferably 150 to 200° C., contains 25 to 60 percent by weight benzene-soluble components, preferably 35 to 50 percent, and has a combined phosphorus content of 4 to 10 percent, preferably 6 to 8 percent. These hydrocarbonaceous resinous products are prepared from polynuclear aromatic-containing hydrocarbon pitches. The preferred hydrocarbon pitches have a melting point in the range of 50 to 200° C. (preferably 75 to 150° C.), and have a solubility in benzene of at least 70 percent by weight. It is important that the hydrocarbon pitches utilized are predominantly polynuclear aromatic-containing pitches which are essentially benzene-soluble, such as coal tar pitches, residues from the aromatization of petroleum products and residues from the manufacture of phenols, if a thermosetting, grindable product is to be obtained. The predominantly polynuclear aromatic-containing hydrocarbon pitches are further characterized as having a density above 1.02 grams per cubic centimeter. Asphaltic pitches, which are predominantly naphenic or aliphatic in nature, have densities below 1.00 gram per cubic centimeter and are not susceptible to conversion under the conditions described herein to useful thermosetting resinous materials. The chemical modification is evidenced by the reduced benzene solubility of the partially-cured thermosetting resin, as compared to the unmodified pitch. In most cases the benzene solubility of the partially-cured product will be at least 10% lower than that of the hydrocarbon pitch starting material.

Generally speaking, the process of this invention is carried out by heating the polynuclear aromatic-containing hydrocarbon pitch at an elevated temperature of 200 to 300° C., preferably 220 to 280° C., in the presence of 10 to 25% phosphorus pentoxide (preferably 15 to 20%) over an extended period of time to obtain the desired softening point. At the lower temperatures and shorter reaction periods, products having softening points as low as 140° C. are obtained. At least 10% of phosphorus pentoxide is necessary to provide satisfactory coefficients of friction for the uses set forth earlier.

This invention may be illustrated further by reference to the following examples in which all "parts" are expressed as parts by weight and all "percentages" are expressed as percent by weight, unless otherwise specified.

EXAMPLE 1

Coal tar pitch having a melting point of about 100° C. and which was 75% soluble in benzene was mixed with 20% by weight of phosphorus pentoxide ($P_2O_5$). The mixture was heated and stirred for 1⅔ hours at 200° C. to produce a phosphorus-containing, heat-curable, partially-cured, thermosetting, hydrocarbonaceous resinous material. This resin had an acetone extractable fraction of 44%, a benzene extractable fraction of 33% and a water extractable fraction of 20%. The softening point (Parr bar) of this resin was 160° C.

Similar resins were prepared by reacting a mixture containing 10% phosphorus pentoxide for 8 hours at 220° C. and 15% phosphorus pentoxide for 6 hours at 220° C.

A thermoset resin was prepared by curing at 500° F. for 4 hours a partially-cured, hydrocarbonaceous, resinous material containing about 8% combined phosphorus. The resulting thermoset resin contained 24% acetone extractable constituents and had a volatile loss of less than 2% when heated at 700° F. for one hour and 22% after an additional hour of heating at 1000° F.

A substantial portion of the phosphorus content of the partially-cured hydrocarbonaceous resinous material is extractable by prolonged contact with boiling water.

EXAMPLE 2

This example shows the preparation of thermoset copolymers from the resins prepared in accordance with this invention.

A. Phenolic resin preparation

To a mixture of phenol (100 parts) and sulfuric acid (1 part) as a catalyst was added slowly formaldehyde (67 parts of a 37% aqueous solution) so as to maintain the temperature of the reactants at 100° C. The reaction mixture was then refluxed for 30 minutes and dehydrated at 120° C. and 25 mm. mercury pressure. The resulting resin had a softening point of 65° C. and could be pulverized at room temperature.

B. Thermoset copolymer preparation

The phosphorus-containing, partially-cured, thermosetting hydrocarbonaceous resinous material prepared in the presence of 20% phosphorus pentoxide (Example 1) was mixed with equal parts of the phenolic resin prepared as described in A above. This mixture after being pulverized was cured in an aluminum pan at 500° F. for 4 hours to produce a hard resilient thermoset copolymer containing 15% acetone extractables and which had a volatile loss of 12% when heated for one hour at 700° F. and a volatile loss of 30% when heated for an additional hour at 1000° F.

Similar copolymers were obtained by curing the phosphorus-containing, partially-cured, hydrocarbonaceous materials with thermosetting cashew nut shell liquid alkylated phenolic resins, urea-formaldehyde resins, melamine-formaldehyde resin, and an epoxy resin.

EXAMPLE NO. 3

Coal tar pitch (an electrode pitch) with a fusion point (Parr bar) of 115° C. was melted in an open container at 150° C. To the molten mixture was added varying portions by weight of phosphorus peroxide ($P_2O_5$). The mixture was agitated and heating continued to a final temperature of 245° C. Heating was stopped and the material allowed to cool to room temperature, then ground to approximately 100 mesh and characterized.

| Sample No. | Percent $P_2O_5$ | Softening Point ° C. Parr bar | Acetone Solubility |
|---|---|---|---|
| a | 1 | 125 | 32.3 |
| b | 5 | 137 | 28.8 |
| c | 10 | 212 | 25.3 |
| d | 25 | 225 | 23.6 |

The granular thermosetting resinous product (100 parts) was blended with a granulated B-stage phenolic resin (90 parts), hexamethylene tetramine (10 parts) and asbestos fiber (600 parts). The mixture was molded at 150° C. and 2000 p.s.i. for 10 minutes, then post-cured for 4 hours at 150° C. From the molding was cut a 1″ x 1″ x ¼″ sample for determination of coefficient of friction at varying temperatures. Samples *a* and *b* showed a drop in coefficient of friction to below 0.2 at temperatures less than 400° C. Samples *c* and *d* maintained a coefficient of friction greater than 0.2 to temperatures substantially above 400° C.

EXAMPLE 4

An asphaltic pitch derived from petroleum with a softening point (ball and ring) of 101° C. was heated as in Example 3 with 25% $P_2O_5$ to a final temperature of 245° C. The resulting product was a soft ductile resin which could not be ground for further evaluation.

Various other embodiments of the present invention will be apparent to those skilled in the art without departing from the scope thereof.

I claim:

1. A process for preparing a normally solid, partially-cured, thermosetting, hydrocarbonaceous resinous material having a softening point of 140 to 250° C. and containing 25 to 60% of benzene-soluble components which comprises mixing a non-asphaltic, predominantly polynuclear aromatic-containing hydrocarbon pitch having a density above 1.02 grams per cubic centimeter and being selected from the group consisting of coal tar pitches, residues from the aromatization of petroleum products and residues from the manufacture of phenols, with 10 to 25 percent phosphorus pentoxide and heating the mixture at an elevated temperature.

2. A process for preparing a normally solid, partially-cured, thermosetting, hydrocarbonaceous resinous material having a softening point of 150 to 200° C. and containing 35 to 50% of benzene-soluble components which comprises mixing a non-asphaltic, predominantly polynuclear aromatic-containing hydrocarbon pitch having a density above 1.02 grams per cubic centimeter and being selected from the group consisting of coal tar pitches, residues from the aromatization of petroleum products and residues from the manufacture of phenols, with 10 to 25 percent phosphorus pentoxide and heating the mixture at an elevated temperature of 200 to 300° C.

3. The process of claim 2 in which said predominantly polynuclear aromatic-containing hydrocarbon pitch is a coal tar pitch.

References Cited by the Examiner

UNITED STATES PATENTS

| 2,450,756 | 10/48 | Hoiberg | 208—4 |
| 2,488,293 | 11/49 | Hoiberg | 208—5 |
| 2,676,910 | 4/54 | Edson | 208—4 |
| 2,992,935 | 7/61 | Winslow | 208—23 |

OTHER REFERENCES

Abraham: "Asphalts and Allied Substances," vol. 1, 5th edition, D. Van Nostrand Co. Inc., N.Y., pp. 63 and 87, 1955.

Murphy: "Journal of the Institute of Petroleum," December 1945, pp. 475 to 485.

O'Donnell: "Analytical Chemistry," vol. 23, No. 6, June 1951, pp. 894 to 898.

Webster's Dictionary, 2nd Unabridged Ed. 1939, definition of "pitch," Abraham (supra), page 468.

ALPHONSO D. SULLIVAN, *Primary Examiner.*